United States Patent [19]

Rappas et al.

[11] 4,148,816
[45] Apr. 10, 1979

[54] ALKALI METAL MERCAPTIDE SOLVENT EXTRACTION OF COBALT, NICKEL

[75] Inventors: Alkis S. Rappas, Bedford; J. Paul Pemsler, Lexington, both of Mass.

[73] Assignee: Kennecott Copper Corporation, New York, N.Y.

[21] Appl. No.: 831,553

[22] Filed: Sep. 8, 1977

[51] Int. Cl.$^2$ .................. C07F 15/04; C07F 15/06
[52] U.S. Cl. .................. 260/439 R; 423/139; 423/149; 423/418; 75/101 BE
[58] Field of Search .............. 423/139, 149, 417, 418, 423/658.5, 140; 75/101 BE, 119; 260/439 R, 609 R, 561 S, 562 S, 583 EE

[56] References Cited

U.S. PATENT DOCUMENTS

| 2,186,398 | 1/1940 | Yabroff | 260/583 EE |
|---|---|---|---|
| 3,663,624 | 5/1972 | Jones | 260/609 R |

OTHER PUBLICATIONS

Clingman, A. et al., "Selective Liquid Ion-Exchangers" J. Appl. Chem. May 13, 1963, pp. 193-198.
Mehrotra, R. et al., "Thiol and Thio-$\beta$-Diketone Derivatives of Some Elements" *Inorganica Chemica Acta Reviews*, 1968, pp. 111-116.
Swan, C. et al., "Complexes of Co, Ni, Tl, Pd with Some Mercapto Compounds" *Chemistry and Industry*, 8/12/67, pp. 1363, 1364.

*Primary Examiner*—Brian Hearn
*Attorney, Agent, or Firm*—John L. Sniado; Anthony M. Lorusso

[57] ABSTRACT

A novel class of extractants and a method of using the extractants in the hydrometallurgical recovery of nickel and cobalt metal. The extractants comprise a water immiscible organic solvent system containing solubilized mercaptide anions. In an important embodiment of the invention, the mercaptide anions are generated by solubilizing an alkali metal mercaptide in a polar organic solvent capable of solvating alkali metal ions. Alternatively, an organic solution of a mercaptan is exposed to an aqueous solution of NaOH or KOH to produce the mercaptide anion.

The extractants are used by being contacted with cobalt, nickel, or cobalt and nickel pregnant aqueous solutions. On mixing, the cobalt and/or nickel values are taken up by the organic as cobalt or nickel mercaptides. These may then be stripped of cobalt and nickel by treatment with an aqueous alkaline solution and carbon monoxide.

6 Claims, No Drawings

ALKALI METAL MERCAPTIDE SOLVENT EXTRACTION OF COBALT, NICKEL

BACKGROUND OF THE INVENTION

This invention relates to novel organic extractants for removing cobalt and nickel values from aqueous solutions.

It is known that nickel can be recovered from its concentrated acidic solutions by electrowinning. However, if the nickel solution is ammoniacal, or if the solution is too dilute, then the nickel ions must be extracted by liquid ion exchange and back extracted into a sulfuric acid solution before being electrowon. The purity of the nickel obtained from such a process is very sensitive to the nature and concentration of the impurities present in the solution.

It is also known that nickel can be obtained from its solutions by hydrogen reduction at elevated temperatures and pressures. Typically, nickel won by this method is very impure.

Because of the difficulties of the foregoing nickel recovery processes, carbonylation processes for recovering nickel and cobalt have recently been developed. In this carbonylation process, very pure nickel and cobalt of acceptable purity are obtained by treating nickel and cobalt values to produce carbonyl compounds. The gaseous compound $Ni(CO)_4$ is then isolated and thermally decomposed to yield pure metal pellets and carbon monoxide gas. The purity of the nickel metal produced by this process is excellent because of the selectivity of the carbonylation reaction and because other metals often present with nickel do not form gaseous compounds.

SUMMARY OF THE INVENTION

The instant invention is based on the discovery that cobalt and nickel may be extracted from an aqueous phase to an organic phase by mercaptide anions solubilized in the organic phase in accordance with the equation:

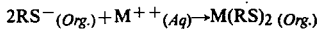

$$2RS^-_{(Org.)} + M^{++}_{(Aq)} \rightarrow M(RS)_2{}_{(Org.)}$$

where R is an organic moiety which renders the $RS^-$ anion substantially water insoluble and $M^{++}$ is $Co^{++}$ or $Ni^{++}$. In contrast, mercaptans (RSH) or mercaptide salts have been observed not to be capable of extracting cobalt or nickel, unless somehow dissociated to form the $RS^-$ ion.

The foregoing discovery provides a basis for the provision of a number of novel cobalt and nickel organic extractants. All comprise a substantially water immiscible organic solvent or solvent system capable of solubilizing nickel and/or cobalt mercaptide and a compatible, substantially water insoluble mercaptide anion solubilized in the solvent system.

One important embodiment of the extractant of the invention comprises a solution of a substantially water insoluble metal mercaptide, e.g., sodium or potassium mercaptide, solubilized in a water immiscible polar organic solvent capable of solubilizing alkali metal ions, e.g., alcohols. With this extractant, the mercaptide anion is produced by dissociation as follows:

$$RSM \rightarrow RS^- + M^+$$

where R is an organic moiety which renders the $RS^-$ anion substantially water insoluble and M is sodium or potassium. The preferred solvent system comprises water insoluble alcohols (preferably at least 20%) and may also include phenols or amides as well as a compatible non-polar water immiscible diluent.

In the process of the invention, one of the foregoing extractants is contacted by an aqueous solution containing cobalt, nickel, or both, and at least a portion of the metal values are extracted into the organic phase as cobalt or nickel mercaptides.

Accordingly, it is an object of the invention to provide a class of mercaptide anion based cobalt and nickel extractants.

Another object is to provide solvent systems for an organic extractant which systems are capable of solvating mercaptide anion and nickel and cobalt mercaptides.

Still another object is to provide an organic extractant which can utilize commercially available, relatively inexpensive mercaptans.

Yet another object of the invention is to provide an extractant that results in cobalt and nickel mercaptides solvated in an organic phase, which mercaptides may be easily stripped of their metal values in the presence of carbon monoxide and an aqueous alkaline solution.

DESCRIPTION OF A PREFERRED EMBODIMENT

There are many sources of aqueous nickel and cobalt containing pregnant liquors which may be treated in accordance with the instant invention. Both ammoniacal and non-ammoniacal solutions of nickel and/or cobalt carbonate, sulfate, hydroxide, etc. may be successfully utilized. The presence of solubilized iron or copper in the solution to be treated by the extractant of the invention is detrimental since these ions compete with cobalt and nickel in the reactions upon which the extraction depends. Accordingly, it is contemplated that the best results will be achieved when the processes herein disclosed are operated downstream from a copper and/or iron extraction system. In this situation, the copper and iron free raffinate of the upstream system or systems makes an ideal liquor for use in the process of the instant invention. One particularly well suited copper removal process is disclosed in U.S. Pat. No. 4,033,765, entitled *Improvements in the Extraction of Copper from Solutions by Reduction With anthraquinols*, to John N. Gerlach. This process, in addition to removing copper from the solution utilizes hydrogen as a reducing agent. Accordingly, it is contemplated that synthesis gas could be used to drive an overall copper, cobalt and nickel winning procedure, hydrogen being used to reduce the copper, and carbon monoxide being used in accordance with the instant process to produce cobalt and nickel.

Nonlimiting examples of liquors which may be treated by the process of the invention, methods for their production, and ores from which they may be obtained are disclosed in U.S. Patent Nos. 3,772,423 to Stevens et al.; 2,576,314 to F. A. Forward; 2,726,934 to Forward et al.; 3,088,820 to Mackiw et al.; 3,644,144 to Vosahlova, and, perhaps most notably, 3,728,105 to R. R. Skarbo, which discloses a method of extracting nickel and cobalt from deep sea manganese nodules.

The processes of the invention require a water immiscible extractant comprising an organic solvent or solvent system and solubilized mercaptide anion. It has now been discovered that, as a general phenomenon, mercaptide anion having the general formula $RS^-$ is capable of complexing with nickel and cobalt when dissolved in an organic solvent to produce organic solvent soluble (R—S)$_2$Ni and (R—S)$_2$Co. R can be any one of an extremely large number of organic radicals. An essential property of the radical selected for R is that it render both the mercaptide anions and the resulting nickel and cobalt mercaptides soluble in the organic solvent system selected. Thus, the mercaptide anion and the solvent system will be matched in accordance with the teachings herein disclosed to produce a homogeneous, water immiscible solution capable of removing nickel and cobalt ions from aqueous solutions and of solvating the nickel and cobalt mercaptides thereby produced.

The ability of the composition of matter of the invention to function as an extractant depends on the presence of mercaptide anion solubilized in the organic, water immiscible solvent. Accordingly, mercaptans and mercaptide salts, if undissociated, cannot extract cobalt and nickel values. Thus, the solvent system and the mercaptan or mercaptide salt added to the system must be selected to effect dissociation so that mercaptide anion is present. In this regard, the solvent, or at least components thereof, act as something more than a diluent or carrier as with most conventional extractants and play an important role in the invention in that they are selected to induce the formation of mercaptide anion and to maintain the anion concentration.

At present, several general approaches to producing mercaptide anions in water immiscible organic solvents have been developed. One approach is disclosed in U.S. application Ser. No. 831,501 entitled *Nickel and Cobalt Extractant and Method of Use*, by A. S. Rappas et al., filed on even date herewith, the disclosure of which is incorporated herein by reference. Briefly, the approach involves solvating a mercaptan within a water immiscible solvent system, one component of which is a basic compound such as an amine. In the solvent, the acid hydrogen of the thiol group of the mercaptan dissociates, resulting in the production of mercaptide anion, and becomes associated with the amine to form a quarternary ammonium species.

Another approach is disclosed in U.S. application Ser. No. 831,552 entitled *Amino-thiol Nickel and Cobalt Extractant and Method of Use* by A. S. Rappas et al., filed on even date herewith, the disclosure of which is incorporated herein by reference. This application discloses an extractant comprising a mercaptan which contains a primary, secondary, or tertiary amine group in its molecular structure. When solubilized in a suitable, typically polar water immiscible organic solvent, the mercaptan undergoes an internal proton shift wherein the SH group dissociates and the hydrogen ion associates with the amino group to form a quaternary ammonium species.

In general, the mercaptide anions suitable for use in nickel and cobalt extractants should form nickel and cobalt complexes where are easily stripped of their nickel and cobalt ions in the presence of carbon monoxide, but should otherwise be inert to carbon monoxide, nickel carbonyl, or carbonyl cobaltate. An alkali metal hydroxide is used in the preferred stripping operation, and the mercaptide should ideally be selected such that it may be stripped of metal values in the presence of as dilute a concentration of alkali as possible. Furthermore, the pH of the pregnant liquor to be treated will affect the decision as to which particular mercaptide anion should be selected. To promote efficiency, the mercaptide ion should also be highly insoluble in water, non-volatile, and free of double or triple bonds or other chemically active functional groups which might affect its stability. Obviously, any particular mercaptide anion utilized will represent a compromise among the foregoing properties.

Mercaptans are very soluble in many organic solvents such as kerosene, various hydrocarbons, aromatic solvents, etc. However, if a mercaptan (RSH) dissolved in such a solvent is mixed with a strongly alkaline aqueous solution in order to dissociate the mercaptan to give the active nickel and cobolt extractant (RS$^-$), the mercaptide of the alkali metal cation will in many cases precipitate into the aqueous phase. Accordingly, the organic phase will contain only small amounts of mercaptan which remain unreactive and the aqueous phase will contain small amounts of mercaptide anion, dictated chiefly by the solubility product of the particular mercaptan selected. The mercaptans best suited for the extractant of this invention have very small solubility products and accordingly can be considered almost insoluble in water in their sodium or potassium mercaptide forms.

In the extractant of the invention, in order to produce and maintain RS$^-$ ions in the organic phase, sodium or the other alkali metal mercaptides are solvated by an organic solvent. Accordingly, the solvent selected must be capable of solubilizing alkali metal cations as well as mercaptide anions. Suitable solvents will contain at least a portion of a polar or highly polar organic liquid having a relatively high dielectric constant. Examples of such solvents include alcohols such as octanol, 2 ethyl hexanol, decyl alcohol, and the like, phenols such as nonyl phenol, and amides such as m acetotoluidide, N-methyl-butyramide and N-methyl-propionamide. Such solvents can be used alone, in mixture, or can be diluted with, for example, kerosene, xylene, toluene, solvent naptha, etc. Best results have been observed to be achieved when the solvent system contains at least 20% by volume water insoluble alcohol. Of course, the lower the molecular weight of the particular alcohol selected, the higher, for a fixed percent volume, will be the polar group to nickel or cobalt molar ratio and the higher will be the alcohol's water solubility. Accordingly, ideal alcohols are those which are substantially water insoluble yet have as low a molecular weight as possible. Addition of a second organic solvent to the alcohol, such as an amide, improves the solubility of sodium or potassium ions in the organic phase. There should be about 6 or more moles of polar solvent per mole of nickel or cobalt to be extracted.

In accordance with the invention, mercaptide anion may be produced in the solvent or solvent system either by solvating a sodium or potassium mercaptide salt in the solvent, or by solvating a mercaptan, and then exposing the solution to an aqueous sodium or potassium hydroxide solution to ion exchange sodium or potassium for the mercaptide's acid hydrogen.

The mercaptans or mercaptide salts which may be added to the solvent system to generate the mercaptide anions may be essentially any mercaptan or salt that is substantially water insoluble. Thus, the operable mercaptans or mercaptide salts for producing the extractant include compounds having the formula RSH, RSNa, or RSK wherein R is selected from among cyclic, linear, or branch chained hydrocarbons, either substituted or unsubstituted, aromatic compounds, and various amines, and ketones. Specific compounds which have been found operable include the sodium and potassium salts of $\alpha$ toluene mercaptan, cyclohexanethiol, 1- dodecanethiol, p-toluene mercaptan, 2-naphthalenethiol, p-methoxy α-toluenethiol, p-chloro-α-toluenethiol, triphenyl methyl mercaptan and 3-phenyl propyl mercaptan. It is of course possible to employ compounds having more than one thiol group.

Any of the foregoing mercaptans, as well as many others, when contacted with an aqueous alkaline solution such as a potassium or sodium hydroxide solution and solubilized in a polar, water immiscible organic system of the type disclosed above, result in an extractant which, when contacted with nickel or cobalt containing solutions, produces organic phase solvated nickel and cobalt mercaptide. Alkali metal cations are transferred from the extractant into the aqueous phase.

This procedure results in effective, almost quantitative transfer of cobalt and/or nickel values into the organic phase. In general, at the temperature of the extraction (usually 40°-70° C.), there is a maximum possible metal loading in the organic phase in the range of 2-20 grams per liter of organic. For each mole of nickel or cobalt to be picked up in the organic phase, there should be at least two moles of $RS^-$ ion in the organic phase. The concentration of mercaptide anion may be up to the saturation point.

It has now further been discovered that the loaded extractant containing nickel and/or cobalt mercaptide can be stripped of its cobalt and nickel content by exposing the loaded extractant to an aqueous alkaline solution, e.g., an NaOH or KOH, solution, and carbon monoxide. For favorable kinetics, it has been observed that the aqueous alkaline stripping solution should contain at least about 30% alkali by weight. Advantageously, stripping in this manner results in cobalt and nickel carbonyl compounds, typically gaseous nickel tetracarbonyl and water soluble carbonyl cobaltate salts. As is known, these substances are easily converted to valuable nickel and cobalt compounds or to extremely pure nickel metal and cobalt of acceptable purity.

One economically desirable aspect of stripping the loaded extractant with carbon monoxide is that such treatment simultaneously regenerates the mercaptide anion, which is produced in its alkali metal salt form. Accordingly, the stripped extractant is automatically made ready for reuse.

Exemplary chemistry of the above-described processes is set forth below.

Extraction $$2RSA \rightleftharpoons 2RS^- + 2A^+$$

$$2RS^- + Ni^{++}{}_{(aq)} \rightarrow (RS)_2Ni_{(org)}$$

$$2RS^- + Co^{++}{}_{(aq)} \rightarrow (RS)_2Co_{(org)}$$

wherein A is Na or K and $RS^-$ is the mercaptide anion.

Carbonylate Stripping $$(RS)_2Ni_{(org)} + 5CO + 4NaOH_{(aq)} \rightarrow Ni(CO)_4 \uparrow + 2RSNa_{(org)} + Na_2CO_3 + 2H_2O$$

$$2(RS)_2Co_{(org)} + 11CO + 12NaOH_{(aq)} \rightarrow 2Na[Co(CO)_4]_{(aq)} + 3Na_2CO_3 + 6H_2O + 4RSNa_{(org)}$$

Caustic Regeneration $$Na_2CO_3 + CaO + H_2O \rightarrow 2NaOH + CaCO_3 \downarrow$$

One nickel and cobalt winning process which utilizes the above described organic, water immiscible extractant is disclosed in detail in U.S. application Ser. No. 831,502 entitled *Method of Winning Nickel and Cobalt*, by A. S. Rappas et al. the disclosure of which is incorporated herein by reference.

One of the primary advantages of the process of the instant invention is that the foregoing reactions can take place at or close to ambient temperatures and pressures. However as is well known, solubility is a temperature dependent phenomenon. Accordingly, if necessary, the process can be run at temperatures greater than 50° C. (e.g., up to 100 to 150° C.). Furthermore, a pressure of 2 to 3 atmospheres is tolerable. That the reactions occur at moderate temperatures and pressures is important because no autoclaves need be employed.

In general, the pH of the cobalt and nickel containing solution to be treated should not be below about 6.0. In this regard, the optimum pH depends on the acid dissociation constant of the particular mercaptan selected. Thus, when the acid dissociation reaction is $RSH \rightleftharpoons RS^- + H^+$, the acid dissociation constant $K_a$ will be:

$$K_a = [RS^-][H^+]/[RSH]$$

Since $RS^-$ is responsible for the extraction and since, for a given mercaptan, $K_a$ is a constant, it is obvious that the pH of the aqueous solution will affect the $RS^-$ concentration. Accordingly, in general, the greater the $H^+$ concentration, the small will be the $RS^-$ concentration.

In the case of the alkali metal mercaptide solution of this invention, mercaptide anion in the organic phase can react with hydrogen ions in the aqueous phase to produce organic solubilized mercaptans in accordance with the equation:

$$2RS^-{}_{(org.)} + H^+{}_{(aq)} \rightleftharpoons RSH_{(org.)}$$

Simultaneously, organic solubilized mercaptide anions and aqueous nickel or cobalt react to irreversibly form nickel and cobalt mercaptides in accordance with the following reactions:

$$2RS^-{}_{(org)} + Co^{++} \rightarrow (RS)_2Co$$

$$2RS^-{}_{(org)} + Ni^{++} \rightarrow (RS)_2Ni$$

As can be seen from the foregoing, both hydrogen and metal ions will be in competition for the mercaptide anion. Once nickel or cobalt mercaptide is formed, it is removed from the equilibria and the process continues although at a slower rate. Accordingly, at some relatively low pH, the nickel and cobalt extraction will become impractical.

As can be appreciated from the above, nickel tetracarbonyl and tetracarbonyl cobaltate ions are produced as a result of the stripping. Advantageously, nickel tetracarbonyl is a gaseous compound which can be removed from the reaction together with excess carbon monoxide. Normally, there will be no other metal present which can form gaseous compounds under the stripping conditions. Consequently, the nickel carbonyl, if subsequently broken down into nickel metal and carbon monoxide, produces an extremely pure nickel product. As is known in the art, nickel tetracarbonyl in the carbon monoxide off gas stream can be concentrated, e.g., condensed under pressure or absorbed into a suitable solvent such as the type disclosed in U.S. Pat. No. 3,688,474 to M. D. Head et al. Once concentrated, the nickel carbonyl is easily thermally decomposed to pure nickel metal and carbon monoxide gas which may be recycled.

The tetracarbonyl cobaltate formed during the carbonylate stripping of cobalt from the organic phase is soluble in the alkaline aqueous phase but insoluble in the organic phase. Accordingly, cobalt values in aqueous solution may be isolated from the organic phase via a liquid-liquid separation.

Laboratory experiments have demonstrated the technical feasibility of the extraction of cobalt and nickel from pregnant liquors using the various extractants of the type disclosed herein and of the carbonylate stripping to yield nickel tetracarbonyl and tetracarbonyl cobaltate. In these experiments, the nickel carbonyl was transported in the carbon monoxide stream and oxidized in a series of nitric acid filled scrubbers. The amount of nickel transported as nickel tetracarbonyl was determined by atomic absorption of the scrubbing solution. The amount of cobalt recovered as tetracarbonyl cobaltate from the alkaline carbonylate stripping solution was also determined by atomic absorption.

The Examples which follow set forth particulars of experiments conducted along the following general lines. All components of the organic phase comprising the percurser to the extractant were mixed together at the temperature indicated in each case under an argon atmosphere. A sodium hydroxide or potassium hydroxides (as indicated) solution, saturated at 10° C. below the operating temperature (temperature of the organic mixture) was prepared in a separate container. Any undissolved sodium hydroxide or potassium hydroxide was removed and the temperature of this alkaline solution was raised to match that of the organic phase. The organic and aqueous solutions were then mixed under an inert atmosphere at a ratio (organic to aqueous) of between 2-4. After spontaneous separation of the phases, the aqueous phase was removed under an inert atmosphere. The organic phase was then used to extract nickel and/or cobalt from an aqueous soltuion.

Thus, a known volume of the organic extractant was mixed with a nickel and/or cobalt ammoniacal solution under an inert atmosphere. Extraction was typically very rapid, equilibrium being established in 15-30 seconds. The loaded organic was then separated from the aqueous phase and the amount of nickel and/or cobalt was determined in the aqueous and organic phases by atomic absorbtion.

The nickel and cobalt loaded organic was stripped with a concentrated sodium hydroxide or potassium hydroxide solution (greater than 25% by weight NaOH or KOH) and carbon monoxide gas.

EXAMPLE 1

| Composition of metal containing solution | Extractant Precursor |
|---|---|
| 8.250 g/l Ni (as NiSO4) | cyclohexanethiol 4 ml |
| 1.175 g/l Co (as CoSO4) | 4-methylcyclohexanol 16 ml |
| pH = 10 | cyclohexane 30 ml |

25 ml of saturated KOH solution were mixed with 50 ml of the extractant precursor solution, 10 ml of $H_2O$ were added, and after a second mixing, the phases were separated resulting in an organic extractant solution containing the potassium salt of cyclohexane thiol. 30 ml of the extractant were then mixed with 25 ml of the metal containing solution at 30° C., resulting after phase separation at 40° C., in a loaded organic solution containing essentially all the Ni and Co. The raffinate contained only 1.75 ppm Ni and 9.2 ppm Co.

EXAMPLE 2

10 ml of cyclohexanethiol were mixed with 15 ml of saturated KOH under argon at 25° C. A white mercaptide precipitate formed. The precipitate was dissolved by addition of an organic solvent system containing 30 ml cyclohexane, 20 ml 4-methylcyclohexanol, and 3 ml of p-nonylphenol. After the addition of 10 ml of water, the phases were separated to produce the organic extractant, 35 ml of which was mixed with 40 ml of a solution comprising 10.625 g/l Ni (pH=10.5). The resulting loaded organic phase contained 12.139 g/l nickel.

EXAMPLE 3

| Composition of Extractant Precursor | |
|---|---|
| α toluenethiol | 17.84 ml |
| xylene | 80.0 ml |
| kerosene | 80.0 ml |
| decanol | 40.0 ml |

The precursor was mixed with 160 ml of saturated aqueous KOH to produce an extractant solution. Sixty (60) ml of the extractant were then added at 54° C. to 5 ml of decanol and the resulting 65 ml solution mixed with 75 ml of an aqueous solution containing 9.937 g/l Ni. After separation of the phases, the loaded organic phase contained 11.45 g/l Ni.

EXAMPLE 4

The loaded organic phase produced in example 3 was stripped of metal values by treatment with saturated (at 30° C.) KOH and 1 atmosphere of CO gas. The stripping reaction was conducted under an inert atmosphere at 49° C. Organic to aqueous volume ratio was approximately 0.70. After 2½ hours during which the three phases of the reaction were intimately mixed, 28 ml of the aqueous phase were replaced with fresh KOH solution. Sixty-five minutes later, 22 ml of the aqueous phase were again replaced, and the reaction was run for 30 more minutes. The gaseous product ($Ni(CO)_4$) was collected during the course of the reaction in a series of nitric acid filled scrubbers, the Ni contents of which was monitored. After the first 2½ hours of stripping, 39.9% of the nickel in the loaded organic had been removed as nickel carbonyl. At the conclusion of the stripping procedure (245 min), the yield was 95.5%.

EXAMPLE 5

| Composition of Extractant Precursor | |
|---|---|
| α toluenethiol | 17.84 ml |
| xylene | 80.0 ml |
| kerosene | 80.0 ml |
| decanol | 40.0 ml |

160 ml of saturated (at 25° C.) KOH were mixed with precursor at 54° C. The phases were separated resulting in an organic extractant phase containing the potassium salt of α toluenethiol and an aqueous alkaline phase containing some mercaptide anion. The organic extractant (80 ml) was then mixed with 75 ml of an aqueous solution containing Ni and Co (as sulfates, [Ni] approximately 11 g/l, [Co] approximately 1.6 g/l, $NH_3$, $(NH_4)_2SO_4$, pH=10.5). After 15 minutes at 46° C., the loaded organic phase contained 10.433 g/l Ni and 1.769 g/l Co.

37 ml of the KOH solution used as described above to activate the extractant precursor were resaturated with KOH at 40° C. This solution was then mixed with 25 ml of the metal loaded organic, and the two-phase mixture was treated with approximately 1 atm. of CO at 49°–50° C. for 2.5 hours to strip nickel and cobalt in the manner described in example 4. At the conclusion of the 2.5 hour stripping procedure, 26.1% of the cobalt reported in the aqueous phase and 79.2% of the nickel had been separated as carbonyl. No cobalt was found in the scrubbing train.

15 ml of the partially stripped organic phase produced as described above were then mixed with 14 ml of fresh nickel and cobalt containing solution. Nickel and cobalt were transferred to the organic phase by difference, resulting in an organic phase containing 10.110 g/l Ni and 1.563 g/l Co.

Copper or iron ions, if present in the pregnant liquors, compete with nickel and cobalt for association with the mercaptide ion in the extractant. Copper is not stripped by carbon monoxide and accordingly, would have to be bled out. Iron, in general, is believed to follow the cobalt chemistry. There are many known methods of separating iron and cobalt carbonyl.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting metals selected from the group consisting of nickel and cobalt from aqueous solutions thereof, said process comprising the steps of:
   providing an extractant comprising a solution of a substantially water insoluble alkali metal mercaptide selected from the group consisting of sodium mercaptide and potassium mercaptide solubilized in a water immiscible polar organic solvent capable of solubilizing alkali metal ions, and,
   contacting the aqueous solution with a pH not below 6.0 with the extractant for a sufficient amount of time to extract a portion of at least one of said metals from the aqueous solution into the organic solvent.

2. The process as set forth in claim 1 wherein the organic solvent is a solvent system comprising at least 20% by volume water insoluble alcohol.

3. The process as set forth in claim 1 wherein the organic solvent comprises at least one substantially water insoluble compound selected from the group consisting of alcohols, phenols, and amides.

4. The process as set forth in claim 3 wherein the organic solvent comprises less than about 50 percent by volume nonpolar, water immiscible diluent.

5. The process as set forth in claim 1 wherein the solvent consists of a single polar organic solvent.

6. The process as set forth in claim 1 wherein the alkali metal mercaptide is selected from the group consisting of salts of α-toluene mercaptan, cyclohexanethiol, 1-dodecanethiol, p-toluene mercaptide, 2-naphthalenethiol, p-methoxy α-toluenethiol, p-chloro-α-toluenethiol, triphenyl methyl mercaptan, and 3-phenyl propyl mercaptan.

* * * * *